G. E. ALPHIN.
COMBINED CULTIVATOR AND FERTILIZER DISTRIBUTER.
APPLICATION FILED JUNE 29, 1908.
908,060.
Patented Dec. 29, 1908.
2 SHEETS—SHEET 1.
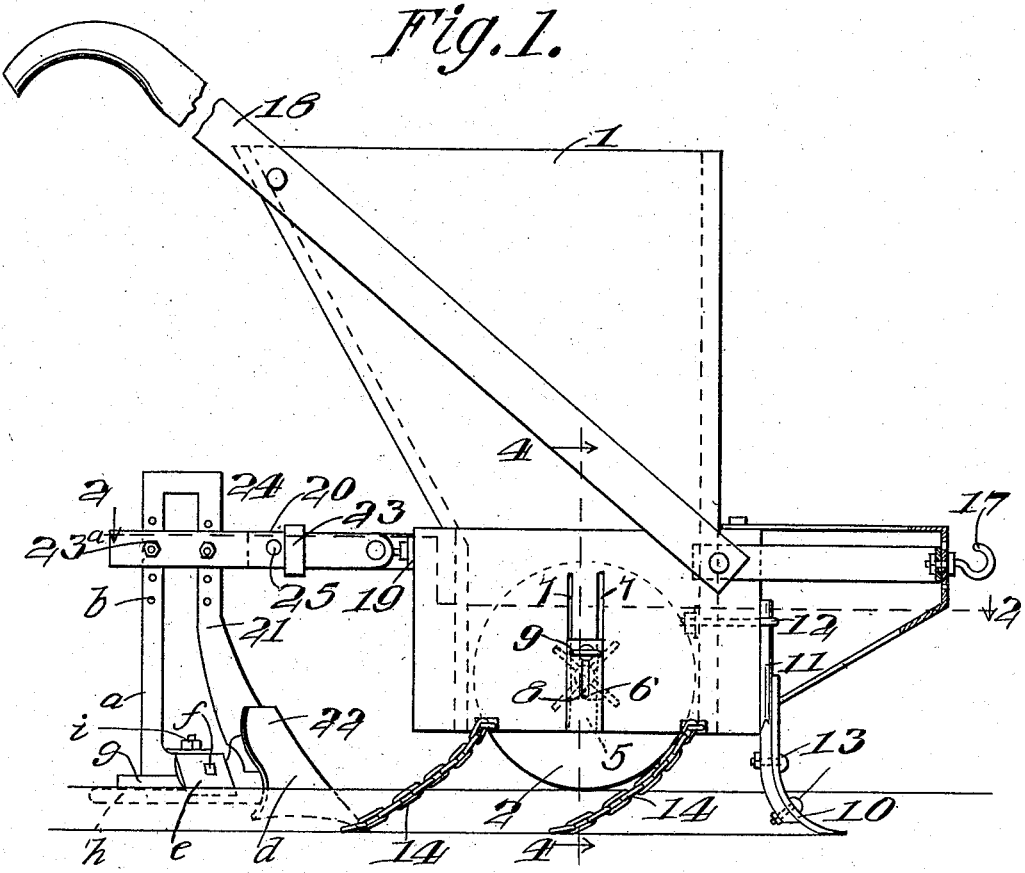
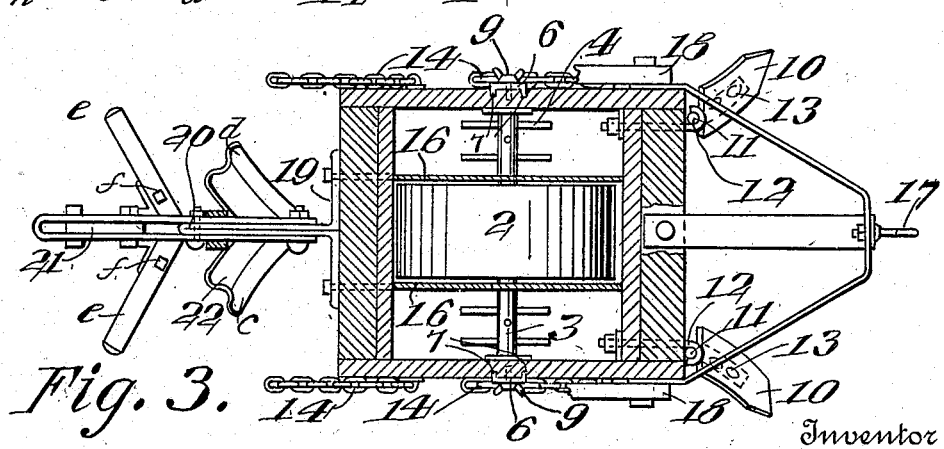

G. E. ALPHIN.
COMBINED CULTIVATOR AND FERTILIZER DISTRIBUTER.
APPLICATION FILED JUNE 29, 1908.

908,060.

Patented Dec. 29, 1908.

2 SHEETS—SHEET 2.

Witnesses

Inventor
G. E. Alphin,
By Attorneys

UNITED STATES PATENT OFFICE.

GILBERT E. ALPHIN, OF MOUNT OLIVE, NORTH CAROLINA.

COMBINED CULTIVATOR AND FERTILIZER-DISTRIBUTER.

No. 908,060.　　　　　Specification of Letters Patent.　　　　Patented Dec. 29, 1908.

Application filed June 29, 1908. Serial No. 440,985.

*To all whom it may concern:*

Be it known that I, GILBERT E. ALPHIN, a citizen of the United States, residing at Mount Olive, in the county of Wayne and State of North Carolina, have invented certain new and useful Improvements in a Combined Cultivator and Fertilizer-Distributer; and I do declare the following to be a full, clear, and exact description of the invention, such as will enable others skilled in the art to which it appertains to make and use the same.

My invention relates to improvements in combined cultivators and fertilizer distributers.

It has for its object more particularly to effect the dropping of the fertilizer laterally or at each side of the hopper, as well as to suitably deliver and spread the fertilizer after dropping into the ground. Also, to suitably prepare the ground as in cultivating the same for the reception of the fertilizer.

With these and other objects in view, the invention consists of certain novel features of construction, combination and arrangement of parts as will be described and particularly pointed out in the appended claims.

Figure 2:
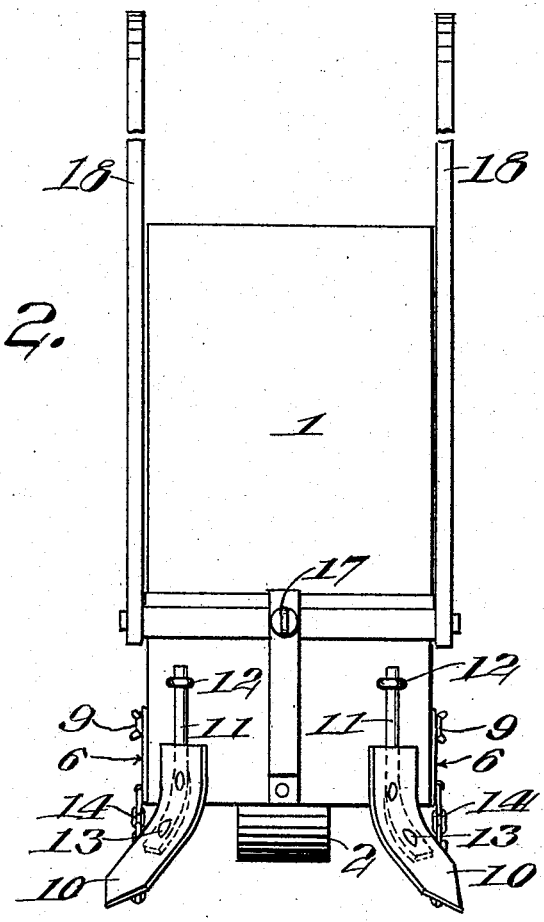
Figure 4:
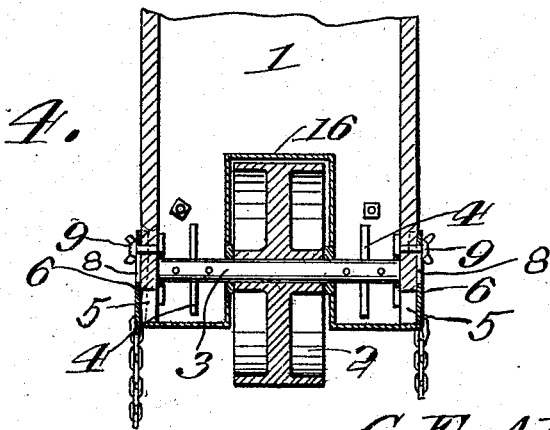

In the accompanying drawing, illustrating the preferred embodiment of my invention, Figure 1 is a side elevation thereof; Fig. 2 is a front elevation of the same; Fig. 3 is a horizontal sectional view taken on the line 2—2 of Fig. 1; and Fig. 4 is a vertical sectional view taken on the line 4—4 of Fig. 1.

In carrying out my invention I provide a suitable hopper, 1, for the reception of the fertilizer, the same being mounted upon a single broad-faced wheel, 2, the axle, 3, of which is journaled in place, which axle carries agitators or distributers, 4, for suitably stirring the fertilizer in said hopper, as in dropping the fertilizer therefrom. The hopper is provided in each side near its bottom edges with openings, 5, for the discharge or dropping of the fertilizer from the hopper from each side thereof in order to provide for the double dropping thereof, as distinguished from delivering the same from a single point, as heretofore has been the case. Arranged upon the outer sides of the hopper, 1, are slides, 6, with their lateral edges bent inwardly and entering or engaging vertical slots or slits, 7, in the sides of the hopper, said slides having vertical slots, 8, which receive adjusting screws, 9, entering said hopper for providing for the vertical adjustment of said slides, as in closing the fertilizer dropping openings or graduating the size of said openings, as may be required. At the front end of the hopper, 1, are arranged shovels or plows, 10, adapted to open the ground for the reception of the fertilizer delivered through the openings in said hopper. Said plows or shovels have their standards, 11, applied thereto obliquely or diagonally and suitably fixed to said shovels and to the front surface of the hopper, preferably by means of approximately U-shaped bolts, 12. The bolts, 12 are passed through the openings in the front of the hopper and suitably held by nuts applied upon the inner side thereof to the inwardly extending shanks of said bolts, while bolts 13 are inserted through the shovels or plows, 10, and in like manner secured to said shovels, the shank portions of the bolts passing through the hopper and through the shovels with their curved portions embracing the standards, 11, for effective retention of the same in place to the shovels and hopper. By means of this arrangement the shovels are adapted to be arranged in upright or perpendicular position so as to be in alinement with the dropping action of the fertilizer to effect the opening of the ground for the reception of the latter, and whereby said shovels may be vertically adjusted according to the depth that may be required to form the furrows in the ground. Preferably chains, 14, each of several links in length, are attached to the hopper at its bottom lateral edges for dangling or dragging in the plowed ground for suitably distributing the fertilizer in the furrows and for mixing the fertilizer with the plowed ground.

A suitable housing, 16, is secured to the hopper directly over, and excluding the wheel, 2, from contact with the contents of the hopper. At the forward end of the hopper is also suitably applied a draft clevis or hook, 17, and laterally to said hopper are secured ordinary guiding handles, 18. Upon the rear portion of the lower end of the hopper is secured a plate or bracket, 19, to which is pivoted a plow supporting beam, 20, preferably of U-shaped formation, and between the legs of which is held a standard, 21, carrying a plow, 22. Said standard comprises parallel members, $a$, having a multiplicity of apertures, $b$, through which bolts, 23$^a$, are adapted to pass so as to effect the adjustment of the height of the plow upon its beam. Said plow comprises duplicate plates, c and d, forming a furrow-point, and secured to the forward member of the standard 21 in any suitable manner, and duplicated, rearwardly-extending inclined wings or arms, e, secured to the rear member of said standard by bolts, f. A plate, g, connects the two members of said standard and has secured upon its bottom edge a wear shoe, h, suitably attached to the plate by a bolt, i. The plow wings, e, extend outwardly beyond the plow points, c and d, and are arranged so as to present to the ground a cutting edge which destroys all weeds, and, at the same time, turns over the ground previously loosened by the plow point. A preferably rectangular band or keeper, 23, encompasses the plow beam, and an arm or bracket, 24, and is adapted to coöperate with a bolt, 25, for holding the beam parallel with said bracket and the plow in operative position. The plow beam and plow may be held in elevated position out of engagement with the ground so as to be in inoperative position, as in passing from field to field, by previously removing the bolt, 25, and sliding said band off the arm or bracket, 24, and then sliding the band rearwardly so that its bottom edge engages the top edge of said arm or bracket and reinserting said bolt in position to prevent said band or sleeve from slipping toward the plow beam. This latter arrangement of parts, however, will be understood as it is the same as embodied in my application filed January 6th, 1903, Serial Number 409,514, patented June 9, 1908, No. 890,485.

From the foregoing description, taken in connection with the accompanying drawing, the construction and operation of the invention will be readily understood without requiring a more extended explanation.

Various changes in the form, proportion and the minor details of construction may be resorted to without departing from the principle, or sacrificing any of the advantages of the invention as defined in the appended claims.

Having thus described my invention, what I claim as new and desire to secure by Letters-Patent, is

1. A device of the character described comprising a hopper provided at the lower edges of its opposite sides with fertilizer distributing openings, hopper supporting wheels, slides for varying the size of said openings and flexible fertilizer distributing elements attached to the opposite sides of the hopper and adapted to travel over the surface of the ground.

2. A device of the class described comprising a hopper provided in its side pieces with vertical fertilizer distributing openings and at opposite sides of said openings with vertical grooves, hopper supporting wheels, slides arranged at opposite sides of the hopper for varying the size of said openings, said slides having inwardly bent flanges to fit in the grooves of the hopper and formed in their bodies with longitudinal slots, and adjusting screws extending through the slots of the slides and screwing into the sides of the hopper.

In testimony whereof I have hereunto set my hand in presence of two subscribing witnesses.

GILBERT E. ALPHIN.

Witnesses:
W. R. JENNETT,
C. FANELTY.